United States Patent [19]

Shigeta et al.

[11] Patent Number: 5,455,883
[45] Date of Patent: Oct. 3, 1995

[54] OPTICAL WAVE GUIDE AND AN OPTICAL INPUT DEVICE, FABRICATION METHODS THEREOF, AND A LIQUID CRYSTAL DISPLAY APPARATUS USING THE OPTICAL WAVE GUIDE AND THE OPTICAL INPUT DEVICE

[75] Inventors: Mitsuhiro Shigeta, Kyoto; Keisaku Nonomura, Nara, both of Japan

[73] Assignee: Sharp Kabushiki Kaisha, Osaka, Japan

[21] Appl. No.: 43,477

[22] Filed: Apr. 7, 1993

[30] Foreign Application Priority Data

Apr. 7, 1992 [JP] Japan .................................. 4-085428
Apr. 5, 1993 [JP] Japan .................................. 5-078377

[51] Int. Cl.⁶ .................................................. G02B 6/10
[52] U.S. Cl. .................................................. 385/129
[58] Field of Search ............................ 385/128, 129, 385/130; 359/42

[56] References Cited

U.S. PATENT DOCUMENTS

| 4,856,859 | 8/1989 | Imoto | 385/129 |
| 5,134,681 | 7/1992 | Ratovelomanana et al. | 385/129 |
| 5,179,614 | 1/1993 | Kanamori et al. | 385/129 |
| 5,235,663 | 8/1993 | Thomas | 385/129 |
| 5,253,319 | 10/1993 | Bhagavatula | 385/129 |

FOREIGN PATENT DOCUMENTS

| 57-142622 | 9/1982 | Japan . |
| 1-156724 | 6/1989 | Japan . |
| 1-173016 | 7/1989 | Japan . |

*Primary Examiner*—Akm E. Ullah

[57] ABSTRACT

An optical wave guide, an optical input device, fabrication methods thereof, and a liquid crystal display apparatus using the optical wave guide and optical input device are disclosed. The optical wave guide includes: a core region having a refractive index $n_c$ through which an optical signal is transmitted; and a cladding layer in which low refractive index layers having a refractive index $n_l$ and high refractive index layers having a refractive index $n_h$ are alternately deposited. A side face of the core region is covered with the cladding layer, and the refractive indices satisfy conditions of $n_l < n_h$, and $n_l < n_c$. The optical input device includes: a transparent substrate; the optical wave guide formed in the transparent substrate; an optical input portion; and a plurality of optical output portions for connecting a side face of the optical wave guide to a surface of the transparent substrate. The optical signal from the optical input portion is transmitted through the optical wave guide and output from the optical output portions to the outside of the transparent substrate. The liquid crystal display apparatus includes: a display medium; a plurality of pixel electrodes for driving the display medium; a plurality of signal lines; a plurality of photoconductors having photoconductive portions provided for the pixel electrodes, respectively; and the optical input device. The optical input device allowing the optical signal to selectively illuminate the photoconductive portions of the photoconductors for connecting or disconnecting the signal lines to or from the pixel electrodes.

10 Claims, 12 Drawing Sheets

OPTICAL WAVE GUIDE AND AN OPTICAL INPUT DEVICE, FABRICATION METHODS THEREOF, AND A LIQUID CRYSTAL DISPLAY APPARATUS USING THE OPTICAL WAVE GUIDE AND THE OPTICAL INPUT DEVICE

BACKGROUND OF THE INVENTION

1. Field of the Invention

The present invention relates to an optical wave guide and an optical input device, and fabrication methods thereof. The present invention also relates to a liquid crystal display apparatus which uses the optical wave guide and the optical input device fabricated by the methods.

2. Description of the Related Art

As planer-type display apparatus, an electroluminescence panel (ELP), a plasma display panel (PDP), a liquid crystal display (LCD) and the like are developed. Among them, the LCD can readily attain a full-color display, and it can readily be connected to a large scale integrated circuit (LSI) without using a special interface. Accordingly, the LCD is the most promising as the planer-type display apparatus, and the technology related to the LCD is remarkably advanced. In recent years, methods in which optical signals are used for signal transmission has been investigated for the LCD, in order to eliminate problems such as signal delay caused by an increase in size of the display apparatus, an increase in the number of pixels to be driven, or the like.

If such optical signals are used for signal transmission, an optical input device is required. The optical input device is used for transmitting light as a signal from a light source to a predetermined portion and for inputting the light. In a conventional optical input device, an optical fiber or an optical wave guide formed on a substrate is utilized.

An optical wave guide is formed on a quartz substrate, on a multicomponent glass substrate or on a plastic substrate. In the case where the optical wave guide is formed on the quartz substrate, a flame deposition method is generally used. In the case where the optical wave guide is formed on the multicomponent glass substrate, an ion exchanging method is generally used. According to both the above methods, the optical wave guide can be formed for either a single mode or a multi mode. In the flame deposition method, a silane gas as a material gas is subjected to a combustion reaction so as to deposit it on the substrate. In the ion exchanging method, a molten salt including ions of Ag, Tl, K or the like as a ion source are diffused in soda lime or borosilicate glass by a heating treatment. Alternatively, in the case where the optical wave guide is formed on the multicomponent glass substrate, a sputtering method can be used.

On the other hand, methods for forming an optical wave guide on a substrate of plastic which is an organic material include a selective photopolymerization method, a photolocking method or the like. In the selective photopolymerization method, polycarbonate as a base material and methyl acrylate as a monomer are selectively exposed to ultraviolet light, so as to perform polymerization. The refractive index of the monomer is lowered by the polymerization, so that the unexposed portion becomes an optical wave guide with a high refractive index.

In addition, an LCD in which optical signals are used for signal transmission necessitates a transistor which performs switching by detecting an input light beam from the optical input device. Conventionally, a pn phototransistor is employed. Regarding a material for photoelectric transduction in the pn phototransistor, single-crystal Si or amorphous Si (hereinafter, referred to as "a-Si") is used for detecting light in a visible light range, and Ge, lead calcogenide, or the like is used for detecting light in an infrared range.

Moreover, when optical signals are used in the LCD for signal transmission, it is necessary to determine the locations of the light source and the optical input device. In a conventional LCD, one light source is provided for each of a plurality of optical input devices which are disposed in parallel to each other in a row or column direction.

In the case where an optical fiber is utilized as an optical input device, there arises a problem in that the connections to other optical components are complicated. For simplifying the connections, there is an attempt to utilize an optical wave guide formed on a substrate as the optical input device. However, this case still has a problem in that an input/output scheme suitable for the optical wave guide has not yet been found.

As described above, the optical wave guide is formed on the quartz substrate by the flame deposition method or formed on the multicomponent glass substrate by the ion exchanging method. However, conventionally, even in a linear optical wave guide, the optical loss has a large value, i.e., 0.1 dB/cm. In a curved optical wave guide, the optical loss has a further increased value. Therefore, the conventional optical wave guide having a length of 10 cm or more cannot be practically used. The reason why the optical wave guide has an optical loss larger than in the case of the optical fiber is that the interface between a side face of the optical wave guide and the substrate may be roughed. For example, if there exists a rough portion having a difference in level of about 100 Å on the side face of the optical wave guide having a diameter of 1 μm, about 5% of light intensity is scattered and lost from this portion. Such a rough portion on the side face inevitably occurs by the conventional fabrication method of the optical wave guide. Therefore, in cases where the optical wave guide is used, it is necessary to reduce the optical loss to a minimum by concentrating the light on a center of wave guide so that the light intensity on the side face is decreased.

Optical loss in the optical wave guide is also caused by nonuniformity in refractive index along the propagation direction. For example, it is assumed that a fiber having a circular section with a diameter of 100 μm has a step portion as a nonuniform portion having a diameter of 110 μm and a length of 100 μm. Even when the variation refractive index is 1% at most, 5% of total light amount is scattered from the step portion, which proves that the nonuniformity severely affects the optical loss. Therefore, in order to equally distribute light to 3000 or more pixel electrodes in the LCD by means of the optical wave guide, a working accuracy in the order of 1 μm is required.

In the LCD, in order to prevent liquid crystal from being deteriorated, it is necessary to periodically reverse the polarity of voltage applied to the liquid crystal during the drive operation. For this purpose, the current direction is periodically reversed when electric charges are to be stored in a capacitor constituted by a pixel. A conventional pn photodiode for detecting light has a rectifying function, so that current cannot flow in the reverse direction to the pn junction. Accordingly, when a conventional pn photodiode is used for driving pixels, the amount of current largely varies depending on the current direction. This results in that a time period required for storing electric charges to a capacitor constituted by a pixel varies depending on the current direction, whereby there arises a problem in that the control is complicated.

With a construction in which a plurality of optical wave guides are connected to a single light source, the number of light sources can be reduced and the LCD construction can be simplified. However, such construction necessitates means for distributing light from the single light source to the plurality of optical wave guides. Unless the distributing means can be formed in a simple structure, the LCD still has a complicated construction.

SUMMARY OF THE INVENTION

The optical wave guide of this invention includes: a core region having a refractive index $n_c$ through which an optical signal is transmitted; and a cladding layer in which two or more low refractive index layers having a refractive index $n_l$ and two or more high refractive index layers having a refractive index $n_h$ are alternately deposited, wherein a side face of the core region is covered with the cladding layer, and the refractive indices satisfy conditions of $n_l<n_h$, and $n_l<n_c$.

In one embodiment, the core region is formed in a surface portion of a transparent substrate, and the cladding layer is formed to cover the side face of the core region in the transparent substrate.

In another embodiment, at least one of the low and high refractive index layers has a thickness between 1 nm to 10 μm in a layered direction.

In another embodiment, at least one of the thicknesses and refractive indices of the low and high refractive index layers constituting the cladding layer are aperiodically repeated.

According to another aspect of the invention, an optical input device is provided. The optical input device includes: a transparent substrate; an optical wave guide formed in a surface portion of the transparent substrate; an optical input portion provided at one end of the optical wave guide; and at least one or more optical output portions for connecting a side face of the optical wave guide to a surface of the transparent substrate, wherein light input from the optical input portion is transmitted through the optical wave guide and output from the optical output portions to the outside of the transparent substrate.

In one embodiment, a refractive index of the optical output portions is larger than that of the optical wave guide.

In another embodiment, the optical output portions include means for scattering the light.

In another embodiment, the optical output portions have a refractive index which is increased from the center of the optical wave guide to the surface of the transparent substrate.

According to another aspect of the invention, an optical input device is provided. The optical input device includes: a transparent substrate; an optical wave guide formed in a surface portion of the transparent substrate; an optical input portion provided at one end of the optical wave guide; and at least one or more optical output portions for connecting a side face of the optical wave guide to a surface of the transparent substrate, wherein at least one of the optical input and output portions includes a SELFOC lens, and a sum of a mode angle of light in the optical wave guide and an angular aperture of the SELFOC lens is 90° or more, and wherein light input from the optical input portion is transmitted through the optical wave guide and output from the optical output portions to the outside of the transparent substrate.

According to still another aspect of the invention, a method of forming an optical wave guide in a transparent substrate by a wet field ion exchanging method is provided. The method includes a step of diffusing ions into the transparent substrate by applying a magnetic field and an electric field in the same direction.

According to still another aspect of the invention, a liquid crystal display apparatus is provided. The liquid crystal display apparatus includes: a display medium; a plurality of pixel electrodes arranged in row and column directions for driving the display medium; a plurality of signal lines arranged in the row or column direction; a plurality of photoconductors having photoconductive portions provided for the plurality of pixel electrodes, respectively, the photoconductors functioning to connect or disconnect the signal lines to or from the pixel electrodes in accordance with an optical signal which illuminates the photoconductive portions; and an optical input device disposed in a direction across the plurality of signal lines, the optical input device allowing the optical signal to selectively illuminate the photoconductive portions of the plurality of photoconductors. In the liquid crystal display apparatus, the optical input device includes: a transparent substrate; an optical wave guide formed in a surface portion of the transparent substrate; an optical input portion provided at one end of the optical wave guide; and a plurality of optical output portions for connecting a side face of the optical wave guide to a surface of the transparent substrate. In the liquid crystal display apparatus, the optical signal input from the optical input portion is transmitted through the optical wave guide and output from the optical output portions to the outside of the transparent substrate, the optical signal illuminating the photoconductive portions of the plurality of photoconductors, respectively.

In one embodiment, the optical input device further includes: a main optical input device constituted by part of the optical wave guide and the optical input portion; a plurality of sub optical input devices constituted by another part of the optical wave guide and the plurality of optical output portions; and a plurality of optical switch elements, provided between the main optical input device and the sub optical input devices, for optically connecting the main optical input device to the sub optical input devices, respectively.

In another embodiment, each of the photoconductors includes a semiconductor device having a layered structure in which three or more layers of an n-type semiconductor layer and a p-type semiconductor layer are alternately deposited.

In still another embodiment, the layered structure further includes an intrinsic semiconductor layer between the n-type semiconductor layer and the p-type semiconductor layer.

In still another embodiment, the pixel electrodes are directly formed on the optical wave guide of the optical input device, and a thickness of the pixel electrodes is 1/10 or less of a wavelength of the light emitted from a light source which is connected to the optical input portion.

Thus, the invention described herein makes possible the following advantages:

(1) an optical signal can be input to a predetermined optical component with a simple structure for connection by using an optical wave guide formed on a substrate;

(2) by the provision of a light scattering portion, the output angle with respect to a substrate can be increased, whereby light can be efficiently input;

(3) by the provision of a SELFOC lens, light can be efficiently input;

(4) by the provision of a SELFOC lens, a light source can be directly mounted on a substrate, whereby the connective structure can be simplified;

(5) by using a method according to the invention, an optical input device with reduced optical loss can be fabricated;

(6) by applying the optical input device according to the invention which has reduced optical loss and good transmission efficiency to a liquid crystal display apparatus, a liquid crystal display apparatus with large capacity and high operational speed can be fabricated; and (7) the liquid crystal display apparatus of the invention can be readily controlled and has a simple construction.

These and other advantages of the present invention will become apparent to those skilled in the art upon reading and understanding the following detailed description with reference to the accompanying figures.

DESCRIPTION OF THE PREFERRED EMBODIMENTS

First, an optical wave guide, an optical input device and their fabrication methods according to the invention will be described.

Figure 21:
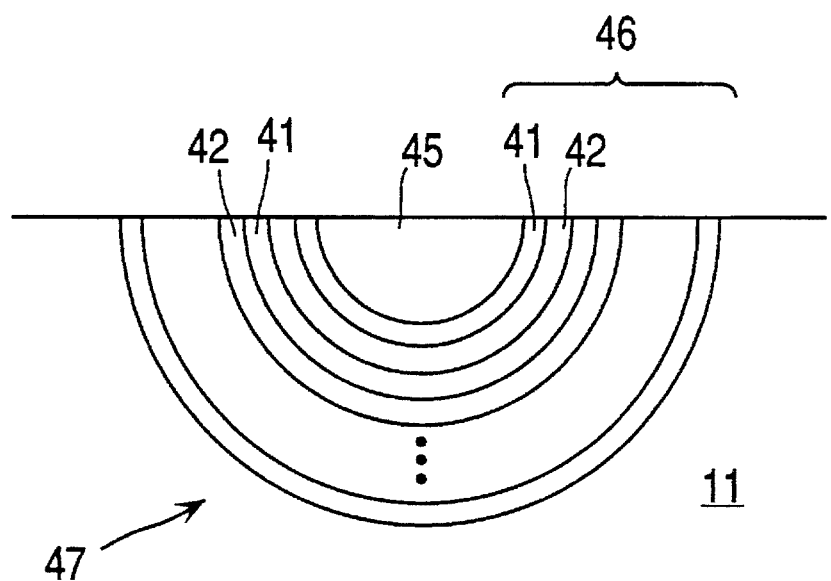
FIG. 21 is a cross-sectional view showing an optical wave guide having a layered structure in one example of the invention.
Figure 22:
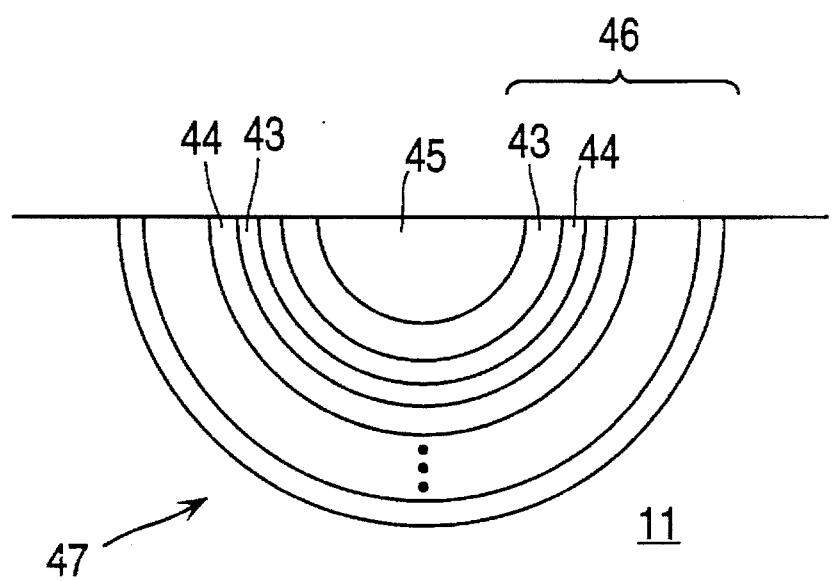
FIG. 22 is a cross-sectional view showing an optical wave guide having an aperiodically layered structure in one example of the invention.

FIGS. 21 and 22 show cross sections of the optical wave guide according to the invention taken perpendicularly to the propagation direction. An optical wave guide 47 is formed in a glass substrate 11. As is shown in FIG. 21, the optical wave guide 47 is constituted of a core region 45 and a cladding layer 46 which is formed so as to cover the side face of the core region 45. Light is transmitted through the core region 45 having a refractive index $n_3$. In the cladding layer 46, a low refractive index layer 41 having a refractive index $n_l$ and a high refractive index layer 42 having a refractive index $n_2$ are alternately formed two or more times. The refractive indices of the respective layers satisfy conditions of $n_l < n_h$, $n_l < n_c$. The light transmitted from the core region 45 to the cladding layer 46 of the optical wave guide 47 must be transmitted from the low refractive index layer 41 to the high refractive index layer 42. The light is totally reflected at the interface between the low refractive index layer 41 and the high refractive index layer 42 and transmitted back to the center of the optical wave guide. At this time, scattered light, i.e, light which is not reflected is transmitted to the side face of the optical wave guide 47.

Then, the scattered light is totally reflected at the interface between the next low refractive index layer 41 and the high refractive index layer 42. By alternately forming the low refractive index layer 41 and the high refractive index layer 42 two or more times, the intensity of light which reaches the side face of the optical wave guide 47 can be reduced. Accordingly, even if the side face of the optical wave guide 47 is roughed, the light will not be lost from the side face.

If each thickness of the high refractive index layer 42 and the low refractive index layer 41 is several hundredth of the wavelength of the transmitted light or less, the above effect of the invention cannot be attained. If the respective thicknesses are too large, the width and the depth of the optical wave guide will be also too large. Therefore, at least one of the layers preferably has a thickness in the range of 1 nm to 10 μm.

Alternatively, in the cladding layer 46, as is shown in FIG. 22, a low refractive index layer 43 and a high refractive index layer 44 may be alternately formed in an aperiodic manner. Specifically, thicknesses of the respective low refractive index layers 43 are made different from each other, and thicknesses of the respective high refractive index layers 44 are made different from each other. By forming the cladding layer 46 so as to have the above structure on the side face of the core region 45, the expansion of the waveform of a electric field can be suppressed, so that the light intensity at the side face can be effectively reduced and the optical loss can also be reduced. It is understood that all of the thicknesses of the low refractive index layers 43 are not necessarily made different, and also all of the thicknesses of the high refractive index layers 44 are not necessarily made different. The thicknesses of the layers have only to be repeated aperiodically. If the cladding layer 46 has a structure in which a thickness of either one of the low refractive index layer 43 and the high refractive index layer 44 is changed in an aperiodic manner, the same effects can be attained. Alternatively, even in a structure in which a refractive index of at least either one of the low refractive index layer 43 and the high refractive index layer 44 is changed in an aperiodic manner, the same effects can be attained.

Next, a structure for an optical input device used as a main optical input device 2 and a sub optical input device 4 will be described with reference to FIGS. 23, 24 and 25.

Figure 23:
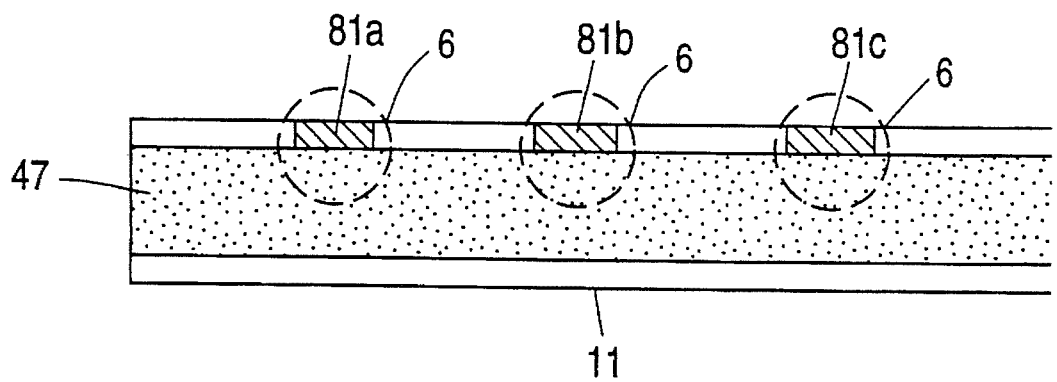
FIG. 23 is a cross-sectional view showing an optical input device including high refractive index portions as optical output portions along the propagation direction according to the invention.

In an optical input device shown in FIG. 23, an optical wave guide 47 for transmitting light into a glass substrate 11 is formed. Optical output portions 6 are formed in a direction perpendicular to the propagation direction. The optical output portions 6 are formed by covering the optical wave guide 47 at windows 81a–81c with a material having a refractive index larger than that of the optical wave guide 47. Alternatively, the optical output portions 6 may be formed by partially removing the glass substrate 11 having a low refractive index which covers the optical wave guide 47 so as to form windows 81a–81c. The intensity of light output from the optical output portions 6 is in proportion to an area of each of the windows 81a–81c. Accordingly, in order to output light with the constant intensity from the respective optical output portions 6, as an optical output portion becomes more remote from the optical input portion of the optical input device, a window of the optical output portion needs a geometrically increased area.

Figure 24:
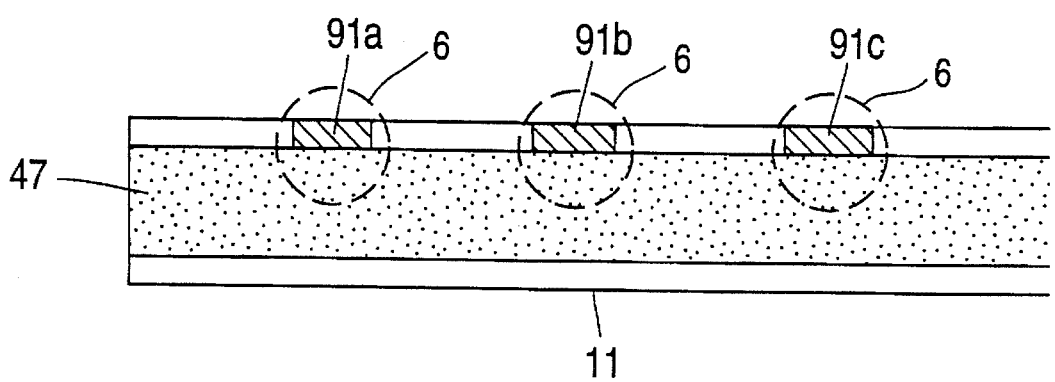
FIG. 24 is a cross-sectional view showing an optical input device including light scattering portions as optical output portions along the propagation direction according to the invention.

In another optical input device shown in FIG. 24, an optical wave guide 47 for transmitting light into a glass substrate 11 is formed. Optical output portions 6 are formed in a direction perpendicular to the light transmission direction. The optical output portions 6 are formed by providing scattering portions 91a–91c in the optical wave guide 47 which are made of a material having a refractive index smaller than that of the optical wave guide 47 and larger than that of the glass substrate 11. The light which reaches the scattering portions 91a–91c from the optical wave guide 47 is scattered from the scattering portions 91a–91c to the outside. Therefore, the intensity of the light output from the optical output portions 6 is in proportion to a volume of each of the scattering portions 91a–91c. If a refractive index is made larger from the center toward the surface of the optical wave guide 47, the light transmitted into the scattering portions 91a–91c is gradually curved in the scattering portions 91a–91c. As a result, the light is output from the optical output portions 6 in a direction perpendicular to the propagation direction through the optical wave guide 47. If the refractive index is constant within the optical wave guide 47, the light is scattered at an angle of about 10° which is substantially equal to a mode angle of the optical wave guide 47.

Figure 25:
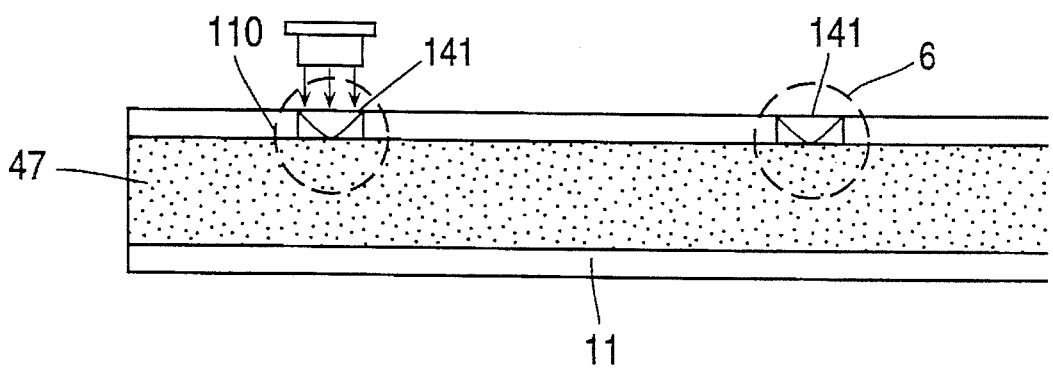
FIG. 25 is a cross-sectional view showing an optical input device including a SELFOC lens as optical input and output portions along the propagation direction according to the invention.

In another optical input device shown in FIG. 25, an optical wave guide 47 for transmitting light into a glass substrate 11 is formed. As an optical input portion 110 and an optical output portion 6, a distributed index lens (a SELFOC lens) 141 is provided. The sum of the mode angle of light transmitted through the optical wave guide 47 and an angular aperture of the SELFOC lens 141 is set to be 90° or more. By providing such optical input portion 110 or optical output portion 6, light can be input and output in a direction perpendicular to the propagation direction through the optical wave guide 47. The intensity of the light output from the optical output portion 6 is in proportion to the diameter of the SELFOC lens 141.

Next, fabrication methods of the optical wave guide and the optical input device according to the present invention will be described.

Figure 9:
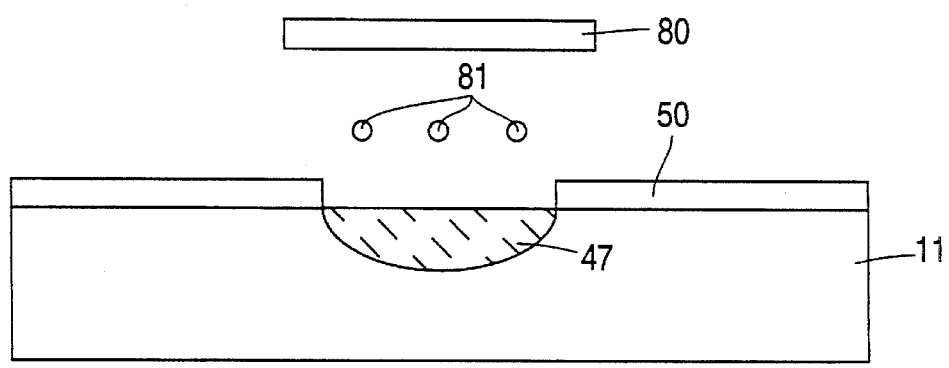
FIG. 9 is a schematic cross-sectional view for illustrating the fabrication method of an optical wave guide for one example of the invention.

FIG. 9 schematically shows a cross section for explaining the fabrication method of an optical wave guide 47. Into a glass substrate 11, ion species 81 for increasing the refractive index are diffused by a wet field ion exchanging method. The glass substrate 11 is formed of soda lime or borosilicate glass containing alkali oxide. An ion exchanging vessel is kept at a temperature of 200°–700° C. A surface of the glass substrate 11 is smoothed to such a degree that the difference in level of the surface is to be 0.1 μm or less. Then, a mask 50 made of a metal such as Ti or an oxide thereof is formed thereon.

The surface of the glass substrate 11 should be smooth and flat in order that the uniformity of an electric field across the surface may be enhanced, that the surfaces of the optical wave guide 47 to be formed may be smooth, and that the unnecessary scattering of light may possibly be eliminated for suppressing the attenuation of light. For the above reasons, the value of 0.1 μm is sufficient for visible light. For infrared light, it is unnecessary to smooth the surface of the glass substrate 11 to such a degree. Then, a platinum electrode is put into a solution in the ion exchanging vessel, so that an electric field is applied. As a result, the ion species 81 of $Ag^+$, $Tl^+$, $K^+$ or the like are selectively diffused into the glass substrate 11 from the side of an anode 80.

In the method according to the invention, an external magnetic field is used when the ion species 81 are diffused into the glass substrate 11.

If, in the ion exchanging vessel, the external magnetic field is applied in a direction perpendicular to the glass substrate 11 which is parallel to the electric field, the diffusion of the ion species 81 into the surface of the glass substrate 11 is enhanced, so as to form the optical wave guide 47 uniformly. Moreover, since ions are held in the direction of magnetic field, the orientation thereof is ensured.

As is shown in FIG. 21, the optical wave guide 47 may be constituted by a core region 45 and a cladding layer 46 having a layered structure in which a low refractive index layer 41 and a high refractive index layer 42 are alternately formed. More specifically, the glass substrate 11 is made of soda lime or borosilicate glass having alkali oxide, as described above. Ion species for increasing the refractive index and ion species for decreasing a refractive index are alternately diffused into the glass substrate 11 by the wet field ion exchanging method. The ion exchanging vessel is kept at 200°–700° C. In this case, as masks made of a metal such as Ti or an oxide thereof, masks each provided with a linear hole having a common length of 1 mm and a width of 100 μm, 90 μm, 80 μm, 70 μm, or the like are successively formed on the smoothed surface of the glass substrate 11. In other words, the widths of the holes are sequentially reduced by 10 μm. For each mask, a platinum electrode is put into the solution and an electric field is applied. Thus, ion species are diffused into the glass substrate 11 from the side of an anode. As the ion species, ion species for increasing the refractive index such as $Ag^+$, $Tl^+$, and $K^+$, and ion species the same as those in the glass substrate 11 are alternately diffused. As a result, as is shown in FIG. 21, in the optical wave guide 47 having a semi-circular shape in section, the cladding layer 46 can be formed to have a layered structure in which the low refractive index layer 41 of 10 μm and the high refractive index layer 42 of 10 μm are alternately formed. At a final step, the core region 45 is formed. In this case, for fabricating the optical wave guide 47 including the cladding layer 46 having the layered structure, the ion exchanging method is used, but alternatively, another method can be used.

If the optical wave guide 47 includes the cladding layer 46 having the above layered structure shown in FIG. 21, light transmitted through the optical wave guide 47 should pass through some interfaces between the low refractive index layer 41 and the high refractive index layer 42. Therefore, the light is concentrated in the vicinity of the center of the optical wave guide 47 and the light intensity at the side face is reduced. Therefore, even when the side face of the optical wave guide 47 is rough, the optical loss due to scattering can be reduced.

In another case, as is shown in FIG. 22, the optical wave guide 47 may include a cladding layer 46 having a layered structure in which a low refractive index layer 43 and a high refractive index layer 44 are alternately formed in an aperiodic manner. In this case, for example, masks each provided with a linear hole having a common length of 1 mm and a width of 100 μm, 95 μm, 85 μm, 75 μm, 65 μm, or the like are used. That is, the widths are reduced in the aperiodic manner. Thus, in the optical wave guide 47 having a semi-circular shape in section, the low refractive index layer 43 and the high refractive index layer 44 can be alternately formed, while some layers have different thicknesses, i.e., the thicknesses of the layers are aperiodic. Alternatively, the thicknesses of the layers may be constant, but refractive indices of the layers may be varied in the aperiodic manner. Alternatively, both the thicknesses and the refractive indices may be changed in the aperiodic manner. In order to change a refractive index, a dose of ion species to be diffused in a layer is made different from that in another layer.

As described above, by aperiodically changing at least one of the thickness and the refractive index in the layered structure of the cladding layer 46, the propagation of the waveform of the electric field can be suppressed. As a result, the light intensity at the side face can effectively reduced and hence the optical loss can be reduced.

In the case where a sub optical input device in which a light scattering portion is simultaneously formed with the optical output portion 6, the ion species 81 for increasing a refractive index and ion species for decreasing a refractive index are both diffused in the glass substrate 11. In other words, in addition to the above-mentioned masks, a mask is formed so as to leave portions for the output of light to photoconductor elements at the same pitches as those of the pixel electrodes. Thereafter, ion species the same as those in the original glass substrate 11 are diffused. As a result, an optical wave guide having a circular shape in section and a light scattering portion are formed.

Figure 10:
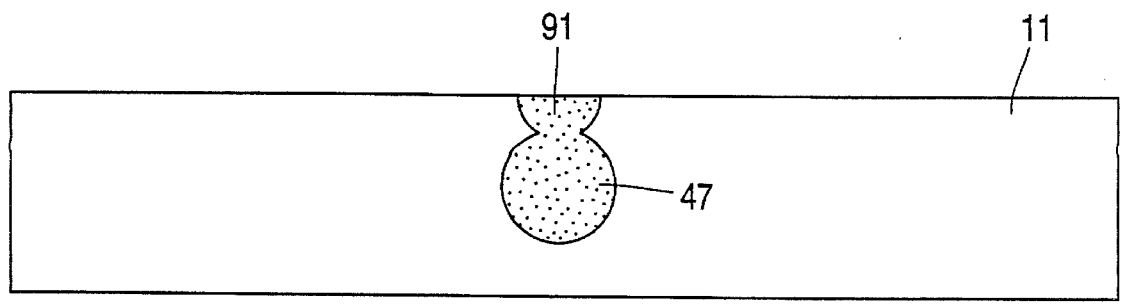
FIG. 10 is a cross-sectional view showing a semi-circular light scattering portion in one example of the invention.
Figure 11:
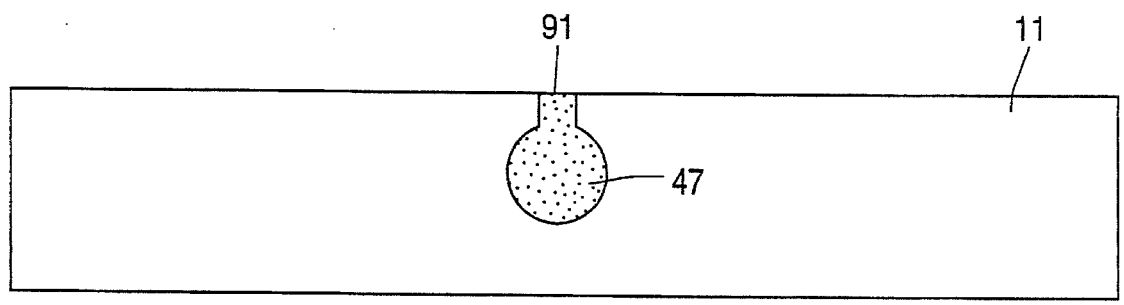
FIG. 11 is a cross-sectional view showing a cylindrical light scattering portion in one example of the invention.

The case where the light scattering portion is used as the optical output portion 6 is described in more detail. A light scattering portion 91 which is formed in the above manner takes a semi-circular shape as is shown in FIG. 10 or a cylindrical shape as is shown in FIG. 11. When light is output from about 3000 light scattering portions 91 at the same time using a single light source, the size of each light scattering portion 91 is determined as follows. The height thereof in a direction perpendicular to the propagation direction is 1/10 or less of a diameter of a core portion of the optical wave guide, and the length thereof along the propagation direction is 1/5 or less of an interval between pixels.

By adjusting the size of each of the light scattering portions 91 as described above, about 0.1% or lower of the optical energy in the optical wave guide 47 can be diffused to the outside of the optical wave guide 47. In the case of a light scattering portion 91 having such a small size, the energy of light scattered at the light scattering portion 91 is substantially in proportion to the volume of the light scattering portion 91. A light scattering portion 91 which is more remote from the light source needs a geometrically increased volume.

Figure 12:
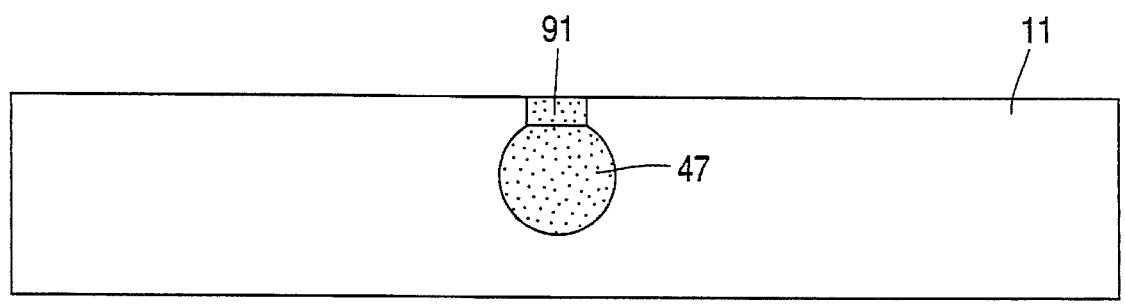
FIG. 12 is a cross-sectional view perpendicular to the propagation direction for illustrating the connection of a cylindrical light scattering portion and an optical wave guide in one example of the invention.
Figure 13:
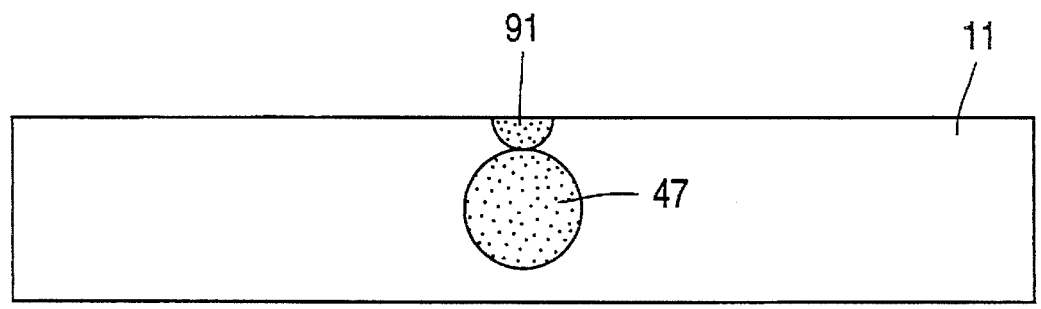
FIG. 13 is a cross-sectional view perpendicular to the propagation direction for illustrating the connection of a semi-circular light scattering portion and the optical wave guide for one example of the invention.
Figure 14:
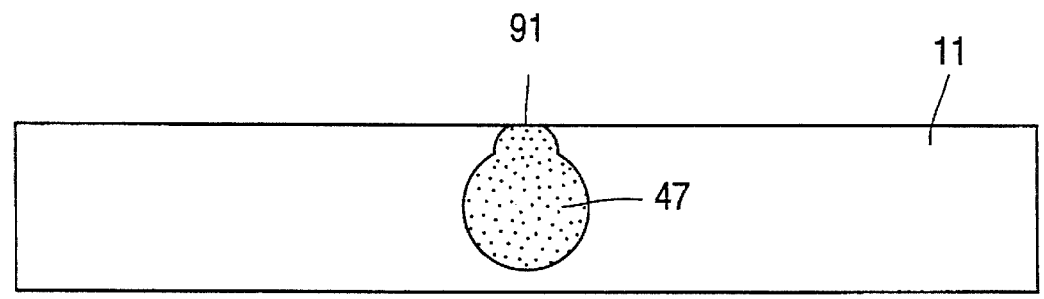
FIG. 14 is a cross-sectional view perpendicular to the propagation direction for illustrating the connection of a reversed semi-circular light scattering portion and the optical wave guide for one example of the invention.
Figure 15:
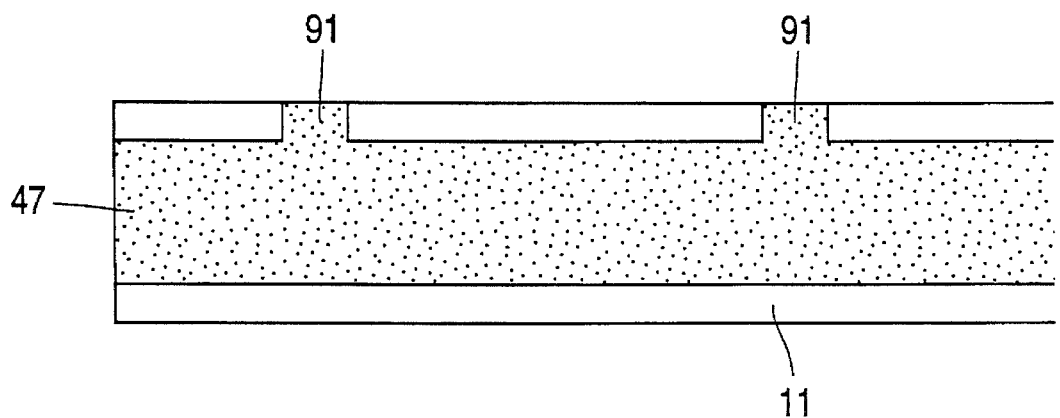
FIG. 15 is a cross-sectional view parallel to the propagation direction for illustrating the connection of the cylindrical light scattering portion and the optical wave guide in one example of the invention.
Figure 16:
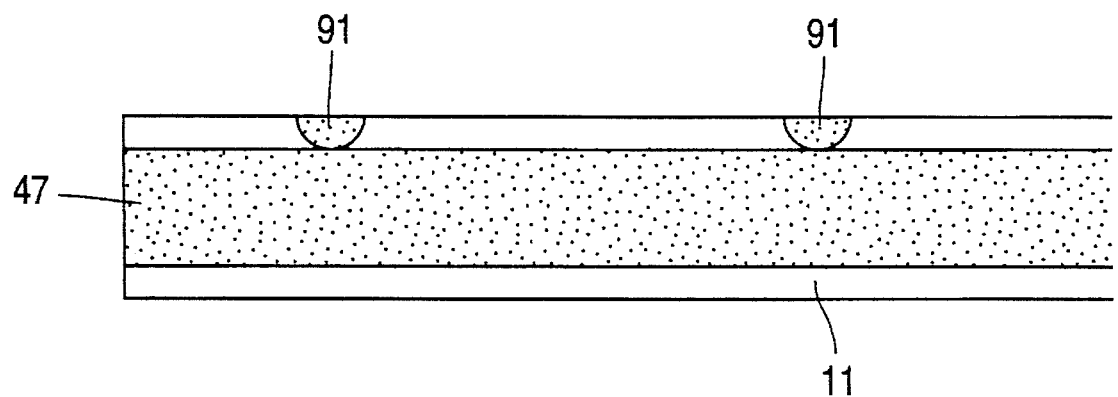
FIG. 16 is a cross-sectional view parallel to the propagation direction for illustrating the connection of the semi-circular light scattering portion and the optical wave guide in one example of the invention.
Figure 17:
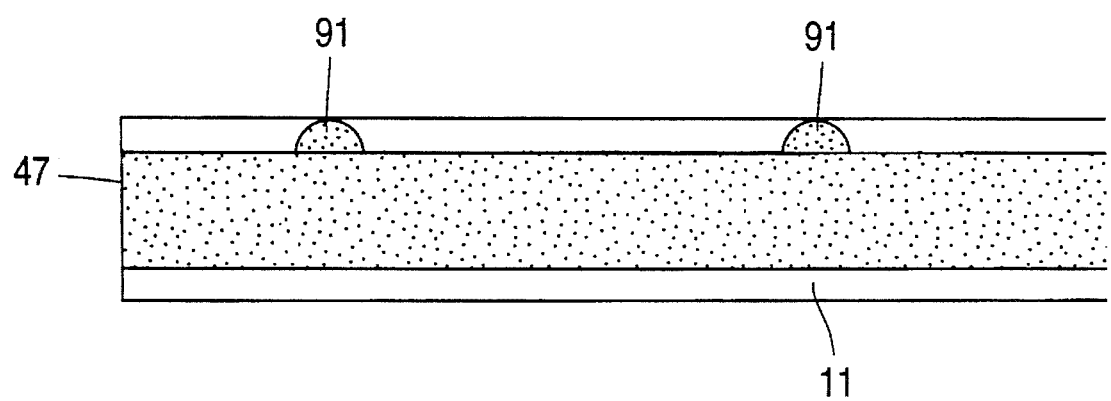
FIG. 17 is a cross-sectional view parallel to the propagation direction for illustrating the connection of the reversed semi-circular light scattering portion and the optical wave guide in one example of the invention.

Various connections of the light scattering portion 91 and the optical wave guide 47 are shown in FIGS. 12–14 and FIGS. 15–17. FIGS. 12–14 show cross sections perpendicular to the propagation direction. FIGS. 15–17 show cross sections along the propagation direction. The light scattering portions 91 shown in FIGS. 12 and 15, in FIGS. 13 and 16, and in FIGS. 14 and 17 take a cylindrical shape, a semi-circular shape, and a reversed semi-circular shape, respectively. A refractive index of the light scattering portion 91 is set between the refractive index of the glass substrate 11 and the refractive index of the optical wave guide 47. The refractive indices of the light scattering portions 91 may be constant or changed depending on the positions thereof. In the case of constant refractive indices, the angle of light scattering is relatively small, e.g., 10° which is substantially equal to the mode angle of the optical wave guide 47. In the case where the refractive indices are distributed as in the distributed index lens (SELFOC lens), the light can be perpendicularly output from the optical wave guide 47.

The shape of the optical wave guide 47 may be circle or square in section. In the case of a planer-type optical wave guide, the above-mentioned core diameter of the optical wave guide 47 corresponds to the width of the optical wave guide 47. In an alternative case, the optical wave guide 47 and the light scattering portion 91 may not be simultaneously formed. Specifically, the light scattering portion 91 may be formed after the formation of the optical wave guide 47.

Figure 20:
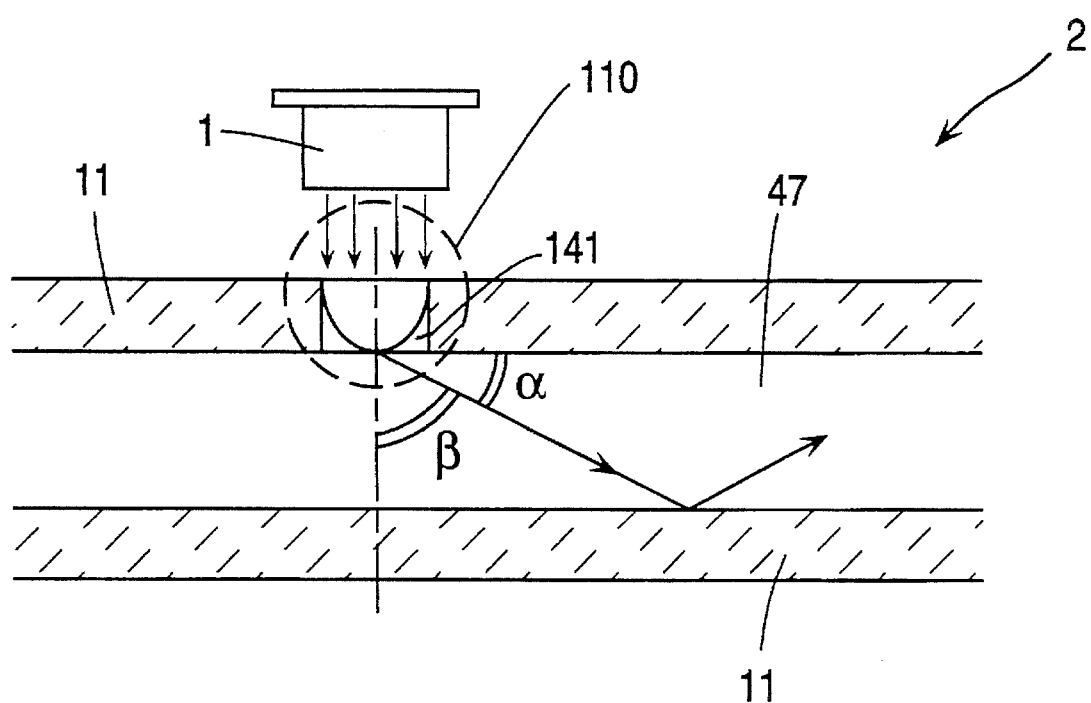
FIG. 20 is a cross-sectional view for illustrating the connection of an optical wave guide and a SELFOC lens in one example of the invention.

Next, the connection of the light source 1 and the main optical input device 2 having the optical input portion 110 is described. In this example, a light emitting diode (LED) for visible light is used as the light source 1. FIG. 20 is a cross-sectional view for explaining the connection of the optical wave guide 47 and the SELFOC lens 141. The light source 1 is disposed above the SELFOC lens 141. Unless the sum of the angular aperture β of the SELFOC lens 141 and the mode angle α of light is 90° or more, the light cannot be effectively input to and output from an optical wave guide. If the SELFOC lens 141 is formed on a glass substrate, the angular aperture thereof can be 35°–70°. In this case, the SELFOC lens 141 is connected to the main optical input device 2 having the mode angle of 0°–55°, and the angular aperture of the SELFOC lens 141 is set to be 60°. The optical loss in the connection to the light source 1 was 3 dB.

Hereinafter, an example of a liquid crystal display apparatus using the above optical wave guide and the optical input device according to the invention will be described with reference to the relevant figures.

Figure 1:
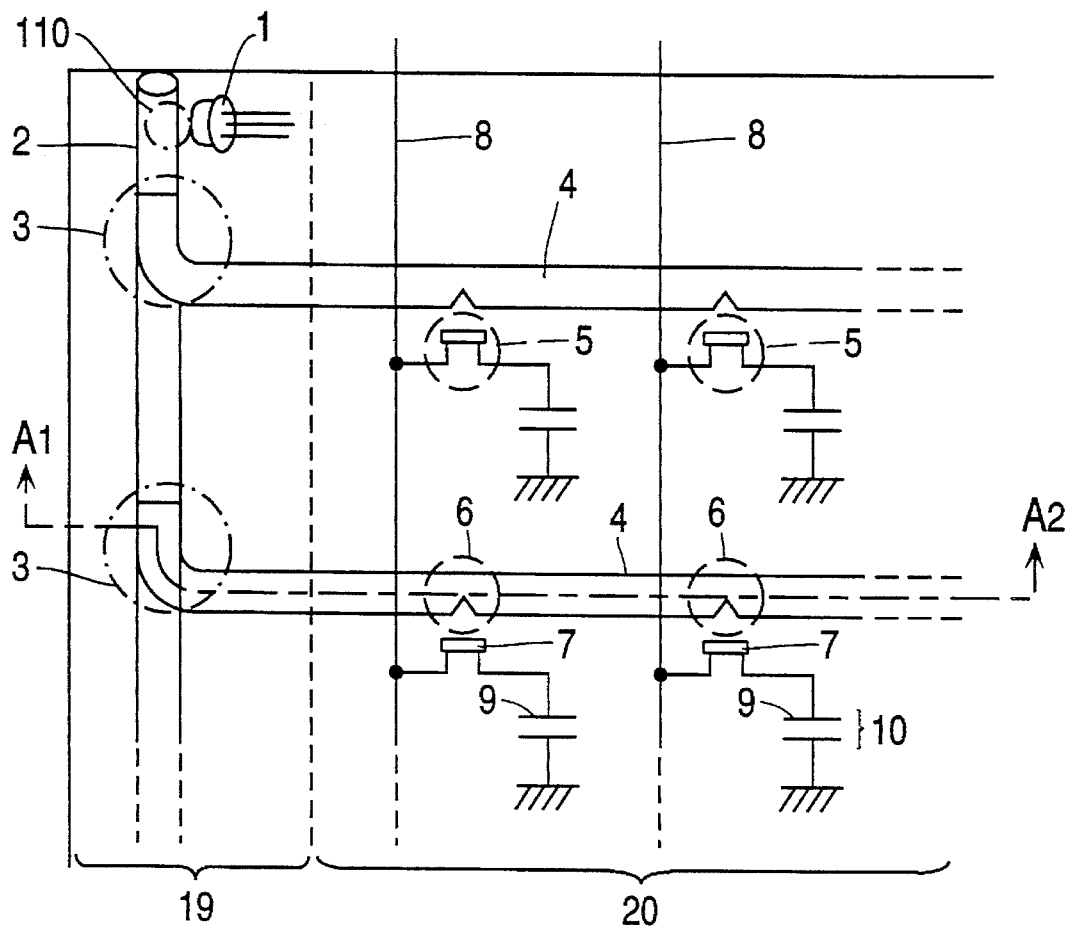
FIG. 1 is an explanatory view showing a structure for a pixel driving portion of a liquid crystal display apparatus in one example of the invention.

FIG. 1 is a schematic view showing a structure of a pixel driving portion of the liquid crystal display apparatus in this example. The liquid crystal display apparatus includes an optical scanning signal generating portion 19 and a display portion 20.

In the optical scanning signal generating portion 19, a main optical input device 2 is disposed. A light source 1 is connected to an optical input portion 110 of the main optical input device 2. A plurality of sub optical input devices 4 are connected to the main optical input device 2 via respective optical switch elements 3.

In the display portion 20, the sub optical input devices 4 are arranged in parallel to each other along a row direction. A plurality of data signal lines 8 are arranged along a column direction. In the vicinities of the crossings of the data signal lines 8 and the sub optical input devices 4, photoconductor elements 5 having photoconductive films 7 are disposed. The photoconductive films 7 are disposed in such a manner that they are in contact with a plurality of optical output portions 6 provided in the sub optical input devices 4, respectively. Each of the photoconductor elements 5 is connected to a pixel electrode 9. The pixel electrode 9, liquid crystal and a counter electrode constitute a pixel 10.

The light emitted from the light source 1 is transmitted to the main optical input device 2. Then, the light passes through a selected one of the plurality of optical switch elements 3. Almost all of the light which has passed through the selected optical switch element 3 is guided into the corresponding one of the sub optical input devices 4. Part of the guided light is output from the optical output portion 6 of the sub optical input device 4 and illuminates the photoconductive film 7, so as to make the photoconductor element 5 conductive. The photoconductor element 5 in the conductive state drives the pixel 10.

Figure 2:
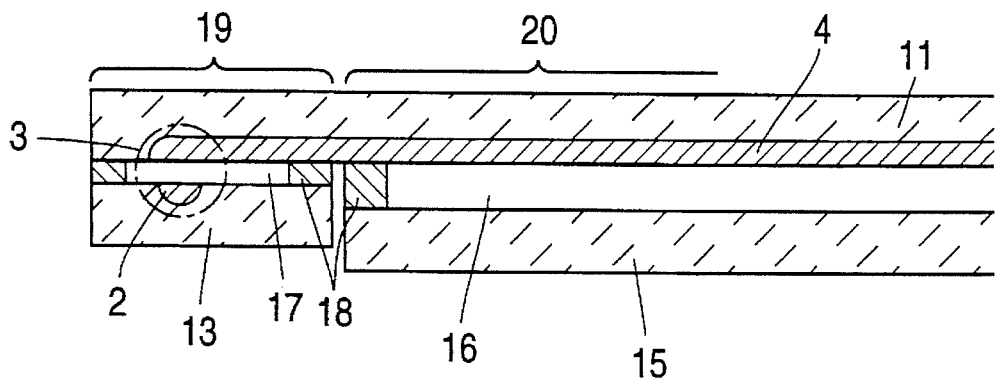
FIG. 2 is a cross-sectional view taken along line $A_1$–$A_2$ in FIG. 1 in one example of the invention.
Figure 3:
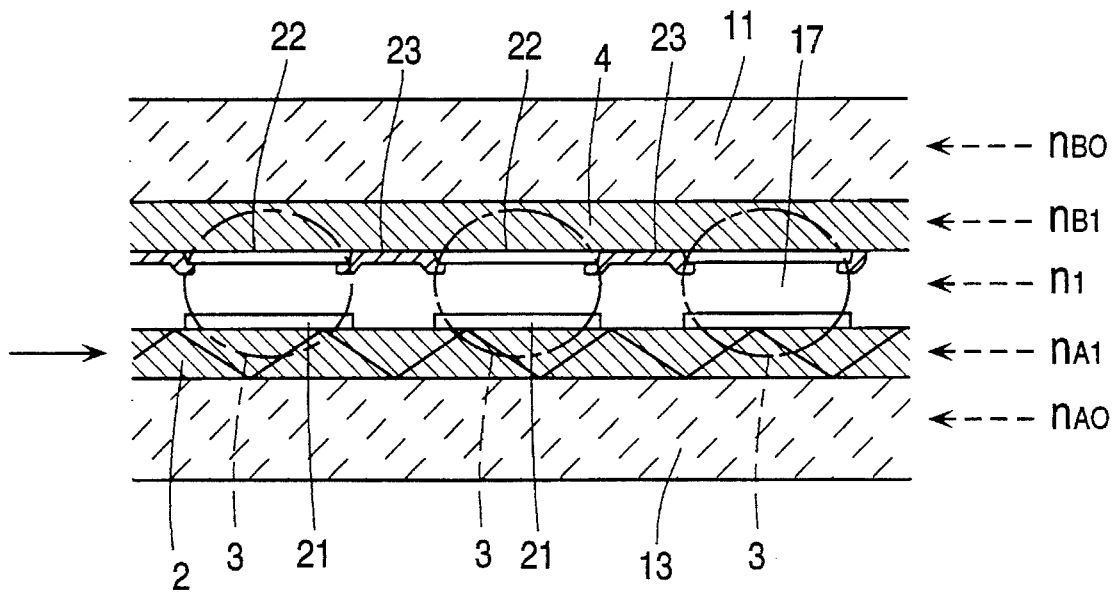
FIG. 3 is an explanatory cross-sectional view of an optical scanning signal generating portion for one example of the invention, when an optical switch element is in an OFF state.
Figure 4:
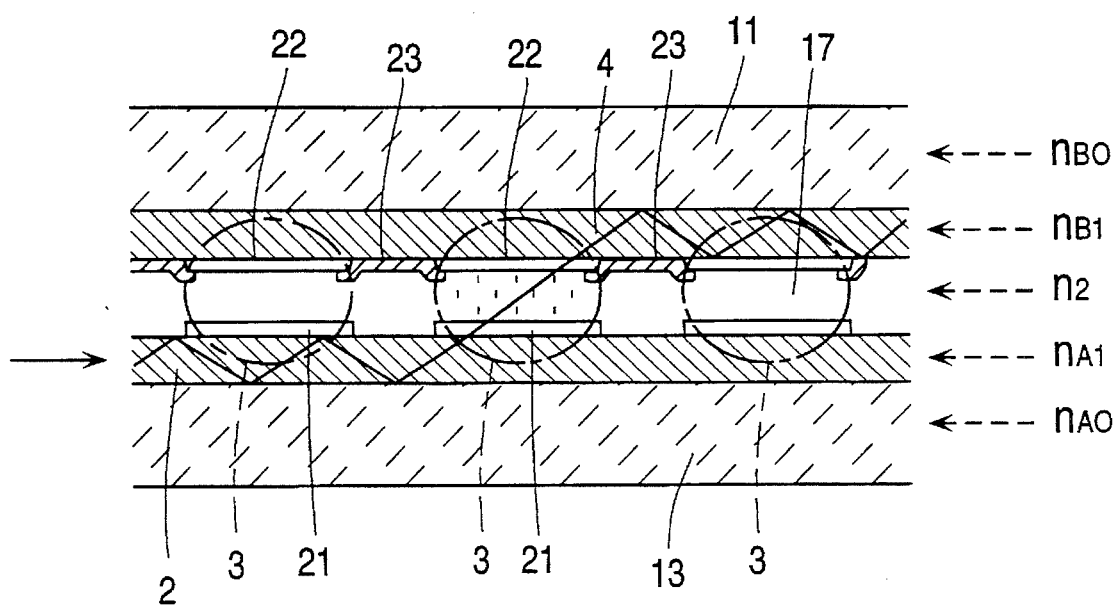
FIG. 4 is an explanatory cross-sectional view of the optical scanning signal generating portion in one example of the invention, when the optical switch element is in an ON state.

FIG. 2 is a cross-sectional view taken along line $A_1$–$A_2$ in FIG. 1. FIGS. 3 and 4 show cross sections along the main optical input device 2 for explaining the optical scanning signal generating portion 19. The structure and operation of the optical switch element 3 in the liquid crystal display apparatus in this example will be described, referring to FIGS. 2–4.

As is shown in FIGS. 2–4, in the optical scanning signal generating portion 19, the sub optical input device 4 is formed on a surface of a glass substrate 11. The main optical input device 2 is formed on a surface of a glass substrate 13. The glass substrates 11 and 13 are disposed so that the surface on which the main optical input device 2 faces the surface on which the sub optical input devices 4 are formed, via a spacer 18. A space formed by the spacer 18, and the glass substrates 11 and 13 is filled with liquid crystal 17. The optical switch element 3 includes liquid crystal 17, part of the main optical input device 2 and part of the sub optical input device 4.

As is shown in FIGS. 3 and 4, on the surface of the glass substrate 13 on which the main optical input device 2 has been formed, a plurality of transparent segment electrodes 21 are formed. On the surface of the glass substrate 11 on which the sub optical input devices 4 have been formed, a plurality of transparent common electrodes 22 and a plurality of common metal electrodes 23 for electrically connecting the plurality of transparent common electrodes 22 to each other are formed.

Such a structure can be realized by using liquid crystal as a cladding material in the optical switch. This structure has an advantage in that it can readily be produced in a small size.

Next, a fabrication method for an optical switch element is described.

In stead of the glass substrates 11 and 13, it is possible to use plastic substrates. A refractive index of glass is selected from values in the range of about 1.45 to 1.95 depending on the composition thereof. Refractive indices of the main optical input device 2 and the sub optical input device 4 are made larger than the refractive indices of the glass substrates 11 and 13 by 0.5%–5%. A refractive index of the liquid crystal 17 used in the optical switch element 3 varies depending on the composition thereof and the orientation direction of liquid crystal molecules with respect to the optical axis. The refractive index of the liquid crystal 17 also varies depending on voltages applied thereto. The liquid crystal 17 has two refractive indices $n_1$ and $n_2$ depending on voltages applied thereto. The refractive index of the liquid crystal 17 is selected so as to satisfy a condition of $1.45 < n_1 < n_2 < 1.8$. A difference between $n_1$ and $n_2$ is set to be about 0.1–0.2. Materials for the main and sub optical input devices 2 and 4 and the liquid crystal 17 are selected so that the refractive indices thereof satisfy these requirements.

In this example, KB7 glass is selected for the glass substrate 13 (the refractive index $n_{A0}=1.52$). Ions of Ag are diffused in optical wave guide portions by the wet field ion exchanging method. Thus, the main optical input device 2 having a stripe shape and a refractive index $n_{A1}=1.55$ is formed to have a width of 50 μm, and a depth of 50 μm. For the glass substrate 11, KzF1 glass (the refractive index $n_{B0}=1.55$) is selected. Ions of Tl are diffused in desired portions. Thus, the sub optical input device 4 having a stripe shape and a refractive index $n_{B1}=1.63$ is formed to have a width of 50–70 μm, and a depth of 30 μm. The transparent segment electrodes 21 and the transparent common electrodes 22 are formed in such a manner that $In_2O_3$ is deposited to have a thickness of 50 nm and patterned by photolithography and etching techniques. For the orientation process toward a wall with which the liquid crystal molecules are in contact, $SiO_2$ is obliquely deposited. For the liquid crystal 17, ferroelectric liquid crystal (3M2CPOOB: (2S,3S)-3-methyl-2-chloropentanoic acid-4',4"-octyloxybiphenylester; $n_1'=1.49$, $n_2'=1.60$) or the like is used.

Next, the operation of the optical switch element 3 is described with reference to FIGS. 3 and 4.

Liquid crystal molecules of the liquid crystal 17 are rotated by ±30° with respect to the orientation axis depending on the applied electric field direction (a positive field or a negative field). In the optical switch element 3 made of the above material, when voltage of a positive field is applied so that the liquid crystal molecules are at right angles with the incident light, the refractive index $n_2$ of the liquid crystal 17 is equal to $n_2=1.60$. When voltage of a negative field is applied, the liquid crystal molecules are rotated by 60° in a negative direction. At this time, the refractive index $n_1$ of the liquid crystal 17 is 1.52 which is obtained by the following equation:

$$n_1 = [n_1^2 \cdot n_2^2 / (n_2^2 \cdot \sin^2\theta + n_1^2 \cdot \cos^2\theta)]^{1/2}$$

where $\theta$ is an angle formed by the optical axis and the liquid crystal molecules.

When a negative voltage is applied to the liquid crystal 17, the optical switch element 3 is in an OFF state. At this time, the liquid crystal 17 has the refractive index $n_1$ of 1.52. Refractive indices $n_{A0}$ and $n_{A1}$ of the glass substrate 13 and the main optical input device 2 satisfy conditions of $n_{A0}<n_{A1}$ and $n_{A1}>n_1$. Therefore, as is shown in FIG. 3, the light is confined in the main optical input device 2 and repeatedly and totally reflected, so as to be transmitted within the main optical input device 2.

When a positive voltage is applied to the liquid crystal 17, the optical switch element 3 is in an ON state. At this time, the liquid crystal 17 has a refractive index $n_2$ of 1.60, and refractive indices of the respective portions satisfy conditions of $n_{A0}<n_{A1}$, $n_{A1}<n_2<n_{B1}$, and $n_{B1}>n_{B0}$ (where, $n_{B0}$ and $n_{B1}$ denote refractive indices of the glass substrate 11 and the sub optical input device 4). Therefore, as is shown in FIG. 4, the light transmitted within the main optical input device 2 passes through the liquid crystal 17 rather than being totally reflected. Then, the light is guided into and confined in the sub optical input device 4 which is opposite to the main optical input device 2.

In the above-mentioned manner, one of the plurality of optical switch elements 3 is sequentially switched to the ON state from the top one to the bottom one in the figures, and the other optical switch elements 3 are switched to the OFF state. As a result, almost all of light emitted from the light source 1 is sequentially guided to the aimed sub optical input devices 4, and hence the optical scanning can be efficiently performed.

Next, the structure of the display portion 20 will be described below.

The display portion 20 is connected to the optical scanning signal generating portion 19 via the glass substrate 11 and the sub optical input device 4 which is formed on the surface of the glass substrate 11. In the display portion 20, a space formed by the glass substrates 11 and 15 and spacers 18 is filled with liquid crystal 16 which constitutes pixels.

Figure 5:
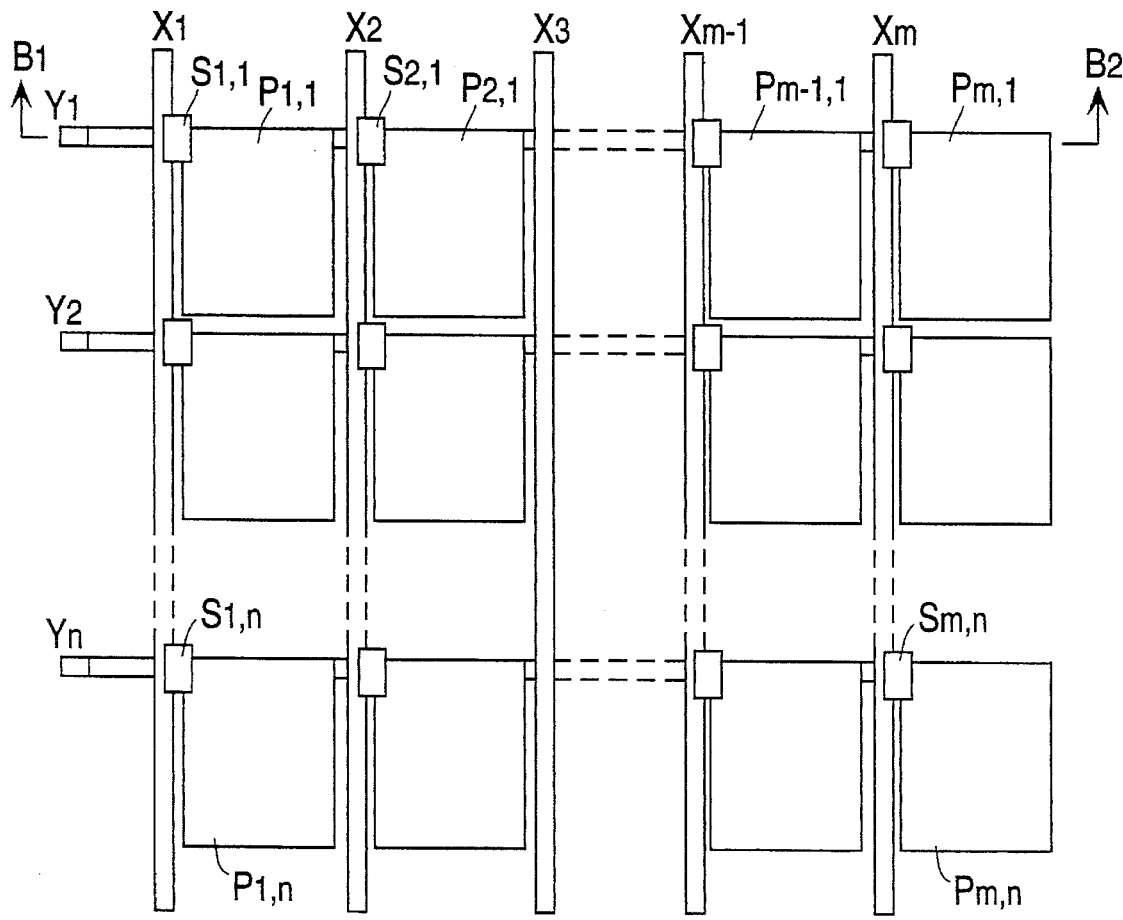
FIG. 5 is a plan view showing a display portion for one example of the invention.
Figure 6:
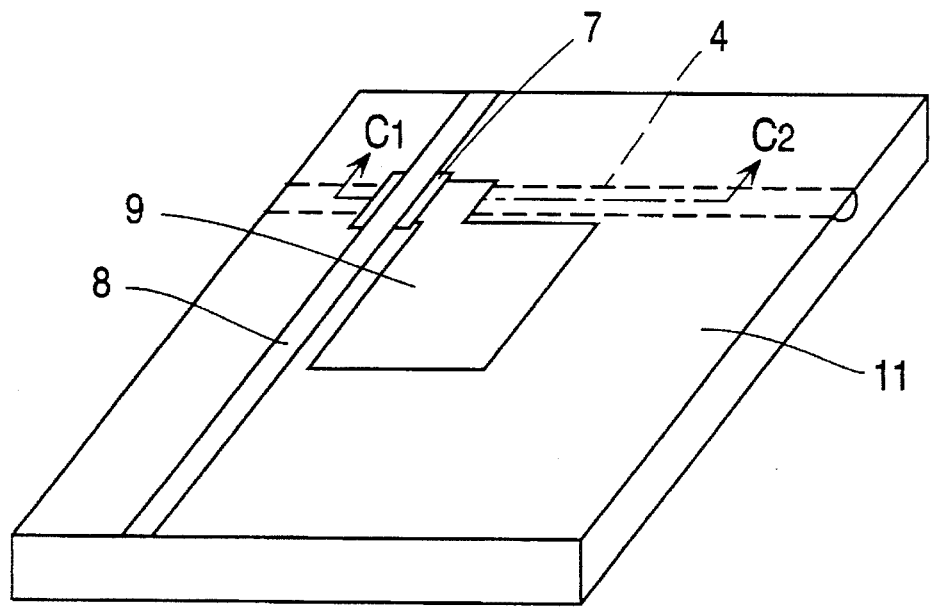
FIG. 6 is a perspective view for illustrating the connection of pixel electrodes and signal lines for one example of the invention.
Figure 7:
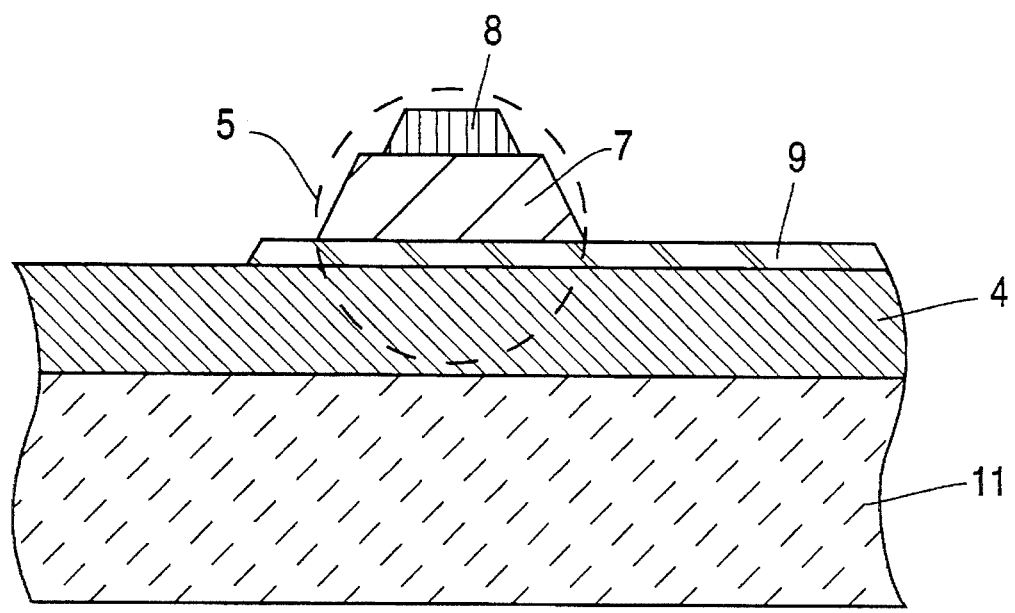
FIG. 7 is a cross-sectional view taken along line $C_1$–$C_2$ in FIG. 6 for one example of the invention.
Figure 8:
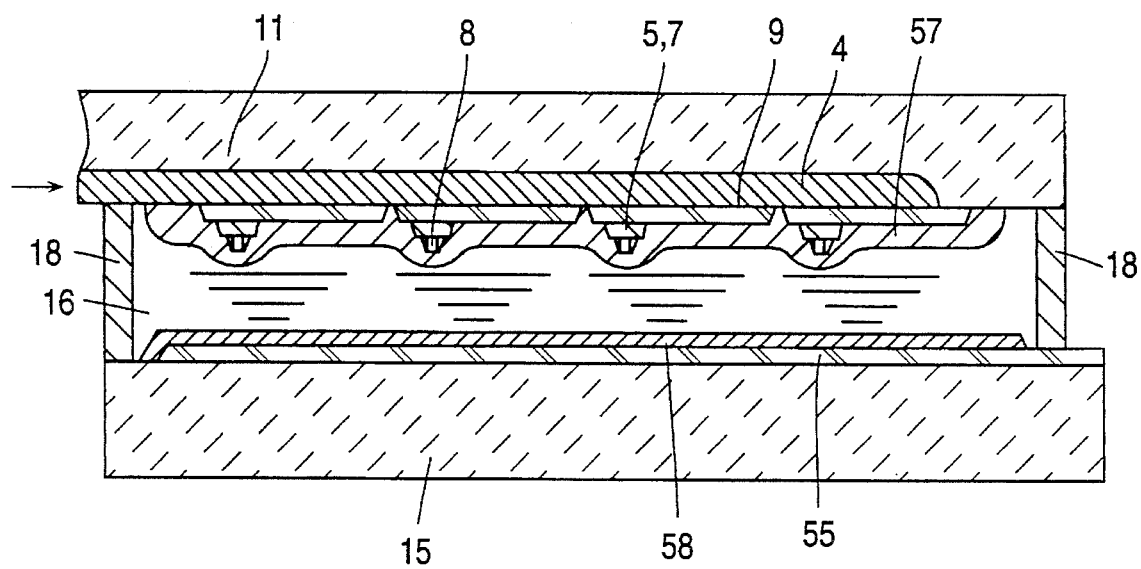
FIG. 8 is a partial cross-sectional view of a liquid crystal display panel taken along line $B_1$–$B_2$ in FIG. 5.

FIG. 5 is a plan view showing the display portion 20. FIG. 6 is a perspective view for explaining the connections of pixel electrodes and signal lines. FIG. 7 shows a cross section taken along line $C_1-C_2$ in FIG. 6. FIG. 8 shows a cross section taken along line $B_1-B_2$ in FIG. 5.

The display portion 20 includes pixels arranged in m rows and n columns. The liquid crystal is of a twisted nematic (TN) type. As is shown in FIG. 5, on a substrate, pixel electrodes 9 ($P_{1,1}-P_{m,n}$) are arranged in a matrix, i.e., m pixel electrodes along a row direction and n pixel electrodes along a column direction are disposed.

For the pixel electrodes 9 ($P_{1,1}-P_{m,n}$), photoconductor elements 5 ($S_{1,1}-S_{m,n}$) are provided, respectively. For columns of the pixel electrodes 9, i.e., $P_{1,1}-P_{1,n}$, $P_{2,1}-P_{2,n}$, ... and $P_{m,1}-P_{m,n}$, data signal lines 8 ($X_{1-Xm}$) extending in the column direction are formed, respectively, on the same substrate. The data signal lines 8 ($X_1-X_m$) are respectively connected to the columns of pixel electrodes 9 ($P_{1,1}-P_{1,n}$, $P_{2,1}-P_{2,n}$, ... and $P_{m,1}-P_{m,n}$) via the photoconductor elements 5 ($S_{1,1}-S_{1,n}$, $S_{2,1}-S_{2,n}$, ... and $S_{m,1}-S_{m,n}$), respectively.

Corresponding to the rows of pixel electrodes 9, i.e., the rows of photoconductor elements 5 ($S_{1,1}-S_{m,1}$, $S_{1,2}-S_{m,2}$, ... and $S_{1,n}-P_{m,n}$), sub optical devices 4 ($Y_1-Y_n$) extending in the row direction are formed in the same substrate.

In order to selectively apply light to the photoconductor elements 5 ($S_{1,1}-S_{m,n}$), the sub optical input devices 4 ($Y_1-Y_n$) are provided under the photoconductor elements 5 ($S_{1,1}-S_{m,n}$) and the pixel electrodes 9 ($P_{1,1}-P_{m,n}$). As is shown in FIGS. 6 and 7, on a glass substrate 11, a sub optical input device 4 extending in the row direction is provided. On the surface of the glass substrate 11 on which the sub optical input devices 4 have been formed, photoconductive films 7 of the photoconductor elements 5 are formed. The photoconductive film 7 is formed so as to electrically connect or not to connect the pixel electrode 9 with the data signal line 8 which extends in the column direction.

Referring to FIG. 8, the display portion 20 will be described in detail.

A counter electrode 55 is formed on a surface of a glass substrate 15. A polyimide film 58 is formed on the entire surface of the glass substrate 15 including the counter electrode 55. The glass substrates 11 and 15 are disposed in parallel so that the pixel electrode 9 faces the counter electrode 55 with a spacer 18 interposed therebetween. A space formed by the glass substrates 11 and 15, and the spacer 18 is filled with liquid crystal 16. On the surface of the glass substrate 11 on which the pixel electrodes 9 have been formed, a base film 57 for an orientation film is formed.

Next, the operation of the display portion 20 will be described.

A scanning signal coupled to an optical switch element 3 is transmitted at a predetermined timing, and light is guided to the corresponding one of the sub optical input devices 4 ($Y_1-Y_n$). The light illuminates the corresponding photoconductor elements 5 ($S_{1,1}-S_{m,n}$). The photoconductor elements 5 usually have high impedance. When illuminated, the photoconductor elements 5 are changed to have low impedance, so as to selectively and electrically connect the data signal lines 8 ($X_1-X_m$) to the corresponding pixel electrodes 9 ($P_{1,1}-P_{m,n}$). By applying this voltage to pixel electrodes, pixels can be driven.

Figure 18:
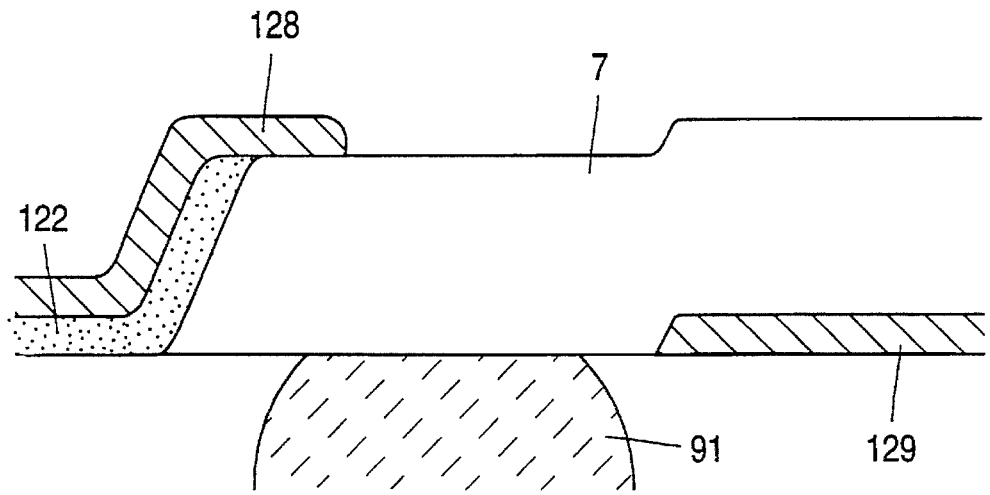
FIG. 18 is a view showing a cross-sectional structure of a photoconductor element in one example of the invention.

Hereinafter, a structure and a fabrication method for a photoconductor element is described in more detail. A photoconductor element may have a structure shown in FIG. 18 instead of the structure shown in FIG. 7. In the structure shown in FIG. 18, the photoconductor element is disposed on a light scattering portion 91. A column direction signal line 128 is formed on a photoconductive film 7 with an insulator 122 interposed therebetween. The photoconductive film 7 serves as a switch for optically controlling an electric signal between the column direction signal line 128 and a pixel electrode 129.

In the case where the wavelength of incident light is 1 μm or less, a material for the photoconductive film may be polycrystalline Si, or a-Si. Preferably, an element structure should be a photodiode of a junction type selected from npn, pnp, npnp, pnpn, and nipin. In another case where incident light is near infrared radiation, a material for the photoconductive film may be polycrystalline PbS, PbSe Te, or mixed crystals thereof. In this case, for regulating the amount of current flowing through the element, p-type or n-type impurities are added.

Figure 19:
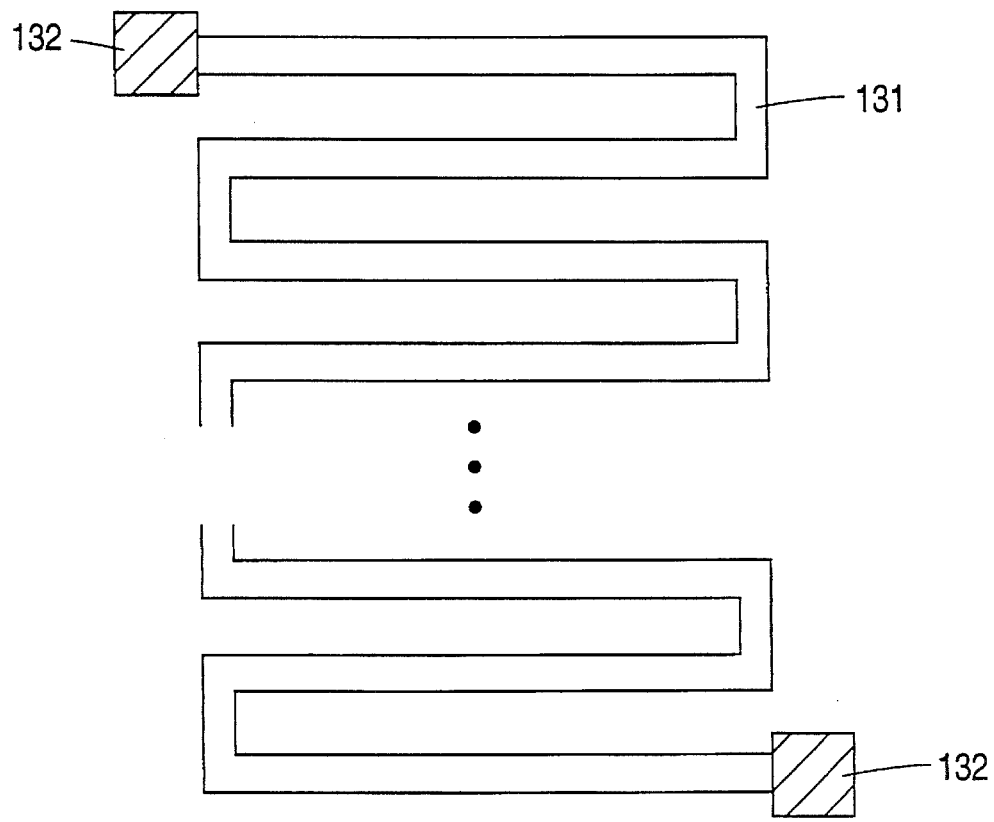
FIG. 19 is a plan view showing a structure for the photoconductor element in one example of the invention.

In this case, as is shown in FIG. 19, electrodes 132 of gold or the like are provided at both ends of a photoconductive film 131, so as to connect a column direction signal line to a pixel electrode. For the purpose of efficient photoelectric transduction, the length of the photoconductive film 131, i.e., the distance between the electrodes 132 is increased, in order that the photoconductive area is increased, and that a resistance in the case of no light illumination is increased. Alternatively, a-Si or a-SiN may be used for the photoconductive film.

Next, referring to FIG. 8, a fabrication method of the display portion 20 is mainly described. First, $In_2O_3$ is deposited to have a thickness of 500 Å on the entire surface of a glass substrate 11. Then, pixel electrodes 9 and common electrodes 22 of optical switch elements 3 (FIG. 3) are simultaneously formed by photolithography and etching techniques. Each of the pixel electrodes 9 partially overlaps the above-mentioned sub optical input device 4. On the overlap portion, a photoconductor element 5 is formed.

The pixel electrode 9 ($In_2O_3$) also functions as one of the electrodes of the photoconductor element 5. Then, a-Si is deposited to have a thickness of about 1–2 μm by a plasma CVD method, and patterned by the photolithography and etching techniques to form a photoconductive film 7. Thereon, a metal such as Ni, Al, or the like is deposited to have a thickness of about 2000–5000 Å. The deposited metal is patterned by etching to simultaneously form data signal lines 8 and common metal electrodes 23 for connecting the common electrodes to each other (FIG. 3).

Thereafter, $SiO_2$ is deposited onto the entire surface. The $SiO_2$ film 57 serves as a base film for an orientation film which will be deposited in the next step. That is, due to the $SiO_2$ film, the liquid crystal molecules are better orientated. Some liquid crystal materials do not necessitate such a base film. Next, for the orientation process toward a wall with which the liquid crystal molecules are in contact, $SiO_2$ is obliquely deposited. These $SiO_2$ films may also have an orientation process effect on the side of the glass substrate 11 which is in contact with the ferroelectric liquid crystal 17 in the optical scanning signal generating portion 19.

In this structure, the sub optical input device 4 is in contact with the photoconductive film 7 (a-Si), the base film for orientation 57 ($SiO_2$), the orientation film ($SiO_2$), and the liquid crystal 16, via the pixel electrodes 9. Refractive indices of the respective materials are shown as follows: 2.0 for $In_2O_3$, 3.5 for a-Si, 1.46 for $SiO_2$, 1.52–1.60 for liquid crystal, and 1.63 for the sub optical input device 4.

However, the thickness of the $In_2O_3$ film functioning as the pixel electrode 9 is as small as 500 Å which is one-tenth when compared with the wavelength of light. Therefore, the $In_2O_3$ film is negligible for considering a cladding material in the optical wave guide. Accordingly, although part of light in the sub optical input device 4 illuminates the a-Si film, the remaining light will not be scattered because the materials with which the sub optical input device 4 is in contact have refractive indices lower than that of the sub optical input device 4. As described above, if the thickness of the $In_2O_3$ film is set to be 1/10 or less as compared with the wavelength of light, the effect of the $In_2O_3$ film is negligible.

On the other hand, on a glass substrate 15, $In_2O_3$ is deposited to have a thickness of 1500 Å, and etched to form a counter electrode 55. To the surface of the glass substrate 15, a polyimide film 58 with a thickness of about 500 Å is applied and rubbed, which is used as a horizontal orientation agent for liquid crystal.

The glass substrates 11 and 15 are laminated to each other with a sealing member in such a manner that they are spaced by a predetermined distance using spacers 18 of 5 μm which are interposed therebetween. Into the space between the substrates, liquid crystal 16 of PCH (phenylcyclohexan) type as a display medium is injected under vacuum and sealed. Thus, a liquid crystal panel is completed.

Hereinafter, the operation of the liquid crystal display apparatus in this example is described.

By applying voltage between the transparent segment electrode 21 and the transparent common electrode 22 shown in FIG. 3, the light which is emitted from the light source 1 and transmitted through the main optical input device 2 is guided into one of the sub optical input devices 4 (e.g., $Y_1$) via the selected optical switch element 3. Then, the light illuminates the photoconductor elements 5 ($S_{1,1}$–$S_{m,1}$) formed on the sub optical input device 4 ($Y_1$). When illuminated, the photoconductor elements 5 ($S_{1,1}$–$S_{m,1}$) are decreased in impedance so as to be conductive. As a result, the data signal lines 8 ($X_1$–$X_m$) and the corresponding pixel electrodes 9 ($P_{1,1}$–$P_{m,1}$) are electrically connected, respectively.

Therefore, data signals which represent a display pattern currently input onto the data signal lines 8 ($X_1$–$X_m$) are simultaneously supplied to the pixel electrodes 9 ($P_{1,1}$–$P_{m,1}$) along the selected row.

In the above-mentioned manner, the light from the light source 1 is sequentially Guided into the respective sub optical input devices 4. Thus, the data signal lines 8 ($X_1$–$X_m$) are electrically connected to the respective rows of pixel electrodes 9 ($P_{1,1}$–$P_{m,1}$, $P_{1,2}$–$P_{m,2}$, . . . , $P_{1,n}$–$P_{m,n}$) in a sequential manner. Due to the electric connection, data signals which represent a display pattern currently input onto the data signal lines 8 ($X_1$–$X_m$) are simultaneously supplied to the pixel electrodes 9 in each row.

When a selection period which is started by the illumination of the photoconductor elements 5 is over, a non-selection period (during this period, the photoconductor elements 5 are not illuminated) is started. In the non-selection period, the photoconductor elements 5 a re in the high impedance state. Therefore, charges which have been charged in the pixel electrode 9 are held in a capacitor 10 of a liquid crystal element until the next selection period is started.

This driving system is the same as a conventional driving system for an active matrix driving type LCD which uses 3-terminal non-linear type elements. The conventional TFT-LCD has a disadvantage in that a gate signal is leaked to a pixel electrode 9 due to a parasitic capacitance between a gate electrode and a drain electrode coupled to the pixel electrode 9. 0n the contrary, in the LCD apparatus according to the present invention, one of two sets of signal line groups on the side of a scanning electrode is formed as an optical wave guide, so that the LCD apparatus of the invention eliminates the disadvantage in the prior art. Therefore, there exist no problems such as reduction in contrast, persistence, shortage in lifetime, which are associated with the distortion on the pixel electrode 9 of a voltage waveform which is symmetrical for positive and negative polarities of a signal caused by a direct current component.

Moreover, in the conventional TFT-LCD, a gate signal is attenuated due to parasitic capacitances for one scanning on one gate electrode and a wiring resistance, whereby the contrast is reduced and the display is deteriorated to be non-uniform. On the contrary, the display apparatus of this example adopts an optical scanning system, whereby problems due to parasitic capacitances and any wiring resistance are not found.

In the above-described example, the optical scanning signal generating portion 19 is provided at one side of the sub optical input device 4, and the single light source 1 is provided at one and upper side. Alternatively, the optical scanning signal generating portions 19 may be provided at both sides of the sub optical input device 4. In another example, the optical scanning signal generating portion 19 at one side is divided into upper and lower portions, and light sources 1 are provided for the upper and lower portions, respectively. In this case, the number of employed light sources 1 is four.

Furthermore, if a color filter is attached to the glass substrate 15, or if the liquid crystal is of a color display mode such as a guest-host mode, a reflection-type or a transmission-type full-color or multicolor display can be attained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical wave guide comprising:
   a core region having a refractive index $n_c$ through which an optical signal is transmitted; and
   a cladding layer in which two or more low refractive index layers having a refractive index $n_l$ and two or more high refractive index layers having a refractive index $n_h$ are alternately deposited to produce a refractive index variation of said cladding layer in a direction perpendicular to a light propagation direction of light propagating in said optical wave guide,
   wherein a side face of said core region is covered with said cladding layer, one of said low refractive index layers is formed on said side face of said core region, and the refractive indices satisfy conditions of $n_l < n_h$, and $n_l < n_c$.

2. An optical wave guide according to claim 1, wherein said core region is formed in a surface portion of a transparent substrate, and said cladding layer is formed to cover the side face of said core region in said transparent substrate.

3. An optical wave guide according to claim 1, wherein at least one of said low and high refractive index layers has a thickness between 1 nm to 10 µm in a layered direction.

4. An optical wave guide according to claim 1, wherein at least one of the thicknesses and refractive indices of said low and high refractive index layers constituting said cladding layer are aperiodically repeated.

5. An optical input device comprising:
   a transparent substrate;
   an optical wave guide formed in said transparent substrate;
   an optical input portion provided at a portion of said optical wave guide; and
   at least one or more optical output portions formed on said side face of said optical wave guide for outputting light propagating in said optical wave guide in a direction substantially perpendicular to a light propagation direction of said light propagating in said optical wave guide,
   wherein light input from said optical input portion is transmitted through said optical wave guide and output from said optical output portions to the outside of said transparent substrate.

6. An optical input device according to claim 5, wherein a refractive index of said optical output portions is higher than that of said optical wave guide.

7. An optical input device according to claim 5, wherein said optical output portions include means for scattering the light.

8. An optical input device according to claim 7, wherein said optical output portions have a refractive index which is increased from the center of said optical wave guide to the surface of said transparent substrate.

9. An optical input device according to claim 5,
   wherein at least one of said optical input and output portions includes a SELFOC lens having an angular aperture, and wherein a sum of a mode angle of light in said optical wave guide and said angular aperture of said SELFOC lens is 90° or more.

10. An optical input device according to claim 9, wherein said optical input portion is formed on said side face of said optical wave guide and includes a SELFOC lens.

* * * * *